United States Patent
Kwon et al.

(10) Patent No.: US 9,184,883 B2
(45) Date of Patent: Nov. 10, 2015

(54) METHOD FOR ALLOCATING RESOURCE TO UPLINK CONTROL SIGNAL IN WIRELESS COMMUNICATION SYSTEM AND APPARATUS THEREFOR

(75) Inventors: Yeong Hyeon Kwon, Anyang-si (KR); Jae Hoon Chung, Anyang-si (KR); Seung Hee Han, Anyang-si (KR); So Yeon Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 346 days.

(21) Appl. No.: 13/254,691

(22) PCT Filed: Mar. 9, 2010

(86) PCT No.: PCT/KR2010/001475
§ 371 (c)(1),
(2), (4) Date: Sep. 2, 2011

(87) PCT Pub. No.: WO2010/114233
PCT Pub. Date: Oct. 7, 2010

(65) Prior Publication Data
US 2011/0317653 A1    Dec. 29, 2011

Related U.S. Application Data

(60) Provisional application No. 61/164,917, filed on Mar. 31, 2009, provisional application No. 61/166,223, filed on Apr. 2, 2009.

(51) Int. Cl.
*H04L 5/00* (2006.01)
*H04L 1/18* (2006.01)
*H04W 72/04* (2009.01)
*H04W 72/12* (2009.01)

(52) U.S. Cl.
CPC ............ *H04L 1/1887* (2013.01); *H04L 1/1861* (2013.01); *H04L 1/1896* (2013.01); *H04L 5/0053* (2013.01); *H04L 5/0055* (2013.01); *H04W 72/04* (2013.01); *H04W 72/1278* (2013.01)

(58) Field of Classification Search
CPC .................................................. H04L 5/0055
See application file for complete search history.

(56) References Cited

U.S. PATENT DOCUMENTS

| | | |
|---|---|---|
| 2005/0220040 A1 | 10/2005 | Petrovic et al. |
| 2007/0064665 A1 | 3/2007 | Zhang et al. |
| 2007/0133458 A1* | 6/2007 | Chandra et al. ............... 370/329 |

(Continued)

FOREIGN PATENT DOCUMENTS

| | | | | |
|---|---|---|---|---|
| WO | WO 2006/046586 A1 * | 5/2006 | ................ | H04L 1/16 |
| WO | WO 2009/120123 A1 * | 10/2009 | ............ | H04W 72/04 |

*Primary Examiner* — Ayaz Sheikh
*Assistant Examiner* — Mariela Vidal Carpio
(74) *Attorney, Agent, or Firm* — Birch, Stewart, Kolasch & Birch, LLP

(57) ABSTRACT

A method for allocating resource to ACK (Acknowledgment)/NACK (Negative-ACK) transmission in a wireless communication system is disclosed. The method includes receiving scheduling information included in a plurality of downlink control channels and data included in a plurality of downlink data channels, over multiple downlink component carriers from a base station, determining ACK/NACK responses corresponding to the data, and allocating resource to the ACK/NACK responses based on the scheduling information corresponding to each of the plurality of downlink control channels and downlink component carrier-dependent offset values.

6 Claims, 9 Drawing Sheets

(56) References Cited

U.S. PATENT DOCUMENTS

| | | | |
|---|---|---|---|
| 2007/0189205 A1 | 8/2007 | Terry et al. | |
| 2008/0285513 A1* | 11/2008 | Jung et al. | 370/329 |
| 2009/0150738 A1* | 6/2009 | Nishio et al. | 714/749 |
| 2009/0207797 A1* | 8/2009 | Shen et al. | 370/329 |
| 2009/0245194 A1* | 10/2009 | Damnjanovic et al. | 370/329 |
| 2010/0054161 A1* | 3/2010 | Montojo et al. | 370/280 |
| 2010/0098012 A1* | 4/2010 | Bala et al. | 370/329 |
| 2010/0113041 A1* | 5/2010 | Bienas et al. | 455/450 |
| 2010/0195583 A1* | 8/2010 | Nory et al. | 370/329 |
| 2011/0059767 A1* | 3/2011 | Parkvall et al. | 455/550.1 |
| 2011/0085516 A1* | 4/2011 | Pajukoski et al. | 370/330 |
| 2011/0111785 A1* | 5/2011 | Lindoff et al. | 455/513 |
| 2011/0141878 A1* | 6/2011 | Che et al. | 370/216 |
| 2012/0106569 A1* | 5/2012 | Che et al. | 370/437 |

\* cited by examiner

PUCCH format 1a and 1b structure (normal CP case)

Single component carrier (e.g. LTE system)

METHOD FOR ALLOCATING RESOURCE TO UPLINK CONTROL SIGNAL IN WIRELESS COMMUNICATION SYSTEM AND APPARATUS THEREFOR

This application is the National Phase of PCT/KR2010/001475 filed on Mar. 9, 2010 which claims priority under 35 U.S.C. 119(e) to U.S. Provisional Application Nos. 61/164,917 filed on Mar. 31, 2009 and 61/166,223 filed on Apr. 2, 2009 all of which are hereby expressly incorporated by reference into the present application.

TECHNICAL FIELD

The present invention relates to a wireless communication system, and more particularly, to a method for allocating resource to uplink control signal in a wireless communication system and an apparatus therefor. The wireless communication system can support at least one of single carrier-frequency division multiple access (SC-FDMA), multi carrier-frequency division multiple access (MC-FDMA), and orthogonal frequency division multiple access (OFDMA). The wireless communication system can also support at least one of frequency division duplex (FDD), half-FDD (H-FDD), and time division duplex (TDD).

BACKGROUND ART

A 3rd generation partnership project long term evolution (3GPP LTE) communication system which is an example of a mobile communication system to which the present invention can be applied will be described in brief.

FIG. 1 is a diagram illustrating a network structure of an Evolved Universal Mobile Telecommunications System (E-UMTS) which is an example of a mobile communication system. The E-UMTS system is an evolved version of the conventional UMTS system, and its basic standardization is in progress under the 3rd Generation Partnership Project (3GPP). The E-UMTS may also be referred to as a Long Term Evolution (LTE) system. For details of the technical specifications of the UMTS and E-UMTS, refer to Release 8 of "3rd Generation Partnership Project; Technical Specification Group Radio Access Network".

Referring to FIG. 1, the E-UMTS includes a User Equipment (UE) 120, base stations (eNode B and eNB) 110a and 110b, and an Access Gateway (AG) which is located at an end of a network (E-UTRAN) and connected to an external network. Generally, the base stations can simultaneously transmit multiple data streams for a broadcast service, a multicast service and/or a unicast service.

One or more cells may exist for one base station. One cell is set to one of bandwidths of 1.25, 2.5, 5, 10, and 20 Mhz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify time and frequency domains to which data will be transmitted and information related to encoding, data size, hybrid automatic repeat request (HARQ). Also, the base station transmits uplink (UL) scheduling information of uplink data to the corresponding user equipment to notify time and frequency domains that can be used by the corresponding user equipment, and information related to encoding, data size, HARQ. An interface for transmitting user traffic or control traffic can be used between the base stations. A Core Network (CN) may include the AG and a network node or the like for user registration of the UE. The AG manages mobility of a UE on a Tracking Area (TA) basis, wherein one TA includes a plurality of cells.

DISCLOSURE OF INVENTION

Technical Problem

Although the wireless communication technology developed based on WCDMA has been evolved into LTE, request and expectation of users and providers have continued to increase. Also, since another wireless access technology is being continuously developed, new evolution of the wireless communication technology is required for competitiveness in the future. In this respect, reduction of cost per bit, increase of available service, use of adaptable frequency band, simple structure, open type interface, proper power consumption of user equipment, etc. are required.

Recently, standardization of advanced technology of LTE is in progress under the 3rd Generation Partnership Project (3GPP). This technology will be referred to as "LTE-Advanced" or "LTE-A." One of important differences between the LTE system and the LTE-A system is difference in system bandwidth. The LTE-A system aims to support a wideband of maximum 100 MHz. To this end, the LTE-A system uses carrier aggregation or bandwidth aggregation that achieves a wideband using a plurality of frequency blocks. A bandwidth of each frequency block can be defined based on a bandwidth of a system block used in the LTE system. Each frequency block is transmitted using a component carrier. Herein, the component carrier may mean a frequency block for carrier aggregation or a center carrier of the frequency block depending on the context. The component carrier and the center carrier may be used together.

Accordingly, the present invention has been devised to substantially obviate one or more problems due to limitations and disadvantages of the related art. An object of the present invention is to provide an allocating resource to uplink control signal in wireless communication system and apparatus therefor.

It is to be understood that technical problems to be solved by the present invention are not limited to the aforementioned technical problems and other technical problems which are not mentioned will be apparent from the following description to the person with an ordinary skill in the art to which the present invention pertains.

Solution to Problem

To achieve the aforementioned objects of the present invention, in one aspect of the present invention, a method for allocating resource to ACK (Acknowledgment)/NACK (Negative-ACK) transmission in a wireless communication system is provided. The method comprises receiving scheduling information included in a plurality of downlink control channels and data included in a plurality of downlink data channels, over multiple downlink component carriers from a base station; determining ACK/NACK responses corresponding to the data; and allocating resource to the ACK/NACK responses based on the scheduling information corresponding to each of the plurality of downlink control channels and downlink component carrier-dependent offset values.

Preferably, the method further comprises transmitting the ACK/NACK responses using the resource via one uplink component carrier to the base station.

More Preferably, the scheduling information corresponding to each of the plurality of downlink control channels include the smallest CCE (Control Channel Element) index among CCE indexes used in each of the downlink control channels.

Further, the resource is divided into at least one resource region for each of the multiple downlink component carriers.

Moreover, the resource includes legacy PUCCH (Physical Uplink Control Channel) resource and new PUCCH resource, wherein the new PUCCH resource is appended on the end of the legacy PUCCH resource or resides within PUCCH format 2 series resource. Here, an allocating position of the resource depends on a type of the data Further, the resource is uplink data channel resource. Here, the method further comprises pre-encoding the ACK/NACK responses in order to provide lower code rate; and encoding the pre-encoded ACK/NACK responses with the same way for normal uplink data In another aspect of the present invention, a user equipment is provided. The user equipment apparatus comprises receiving module for receiving scheduling information included in a plurality of downlink control channels and data included in a plurality of downlink data channels, over multiple downlink component carriers from a base station; processor for determining ACK/NACK responses corresponding to the data and for allocating resource to the ACK (Acknowledgment)/NACK (Negative-ACK) responses based on the scheduling information corresponding to each of the plurality of downlink control channels and downlink component carrier-dependent offset values; transmitting module for transmitting the ACK/NACK responses using the resource via one uplink component carrier to the base station.

Preferably, the resource is divided into at least one resource region for each of the multiple downlink component carriers.

More preferably, the resource comprising legacy PUCCH (Physical Uplink Control Channel) resource and new PUCCH resource, wherein the new PUCCH resource is appended on the end of the legacy PUCCH resource or resides within PUCCH format 2 series resource.

Further, the resource is uplink data channel resource. Here, the processor pre-encodes the ACK/NACK responses in order to provide lower code rate, before encoding the ACK/NACK responses with the same way for normal uplink data.

Advantageous Effects of Invention

According to the embodiments of the present invention, the following advantages can be obtained.

First of all, a method for efficiently transmitting and receiving a signal in a wireless communication system and an apparatus therefor can be provided.

Second, a method for allocating resource to uplink control signal in wireless communication system and apparatus therefor can be provided.

It is to be understood that the advantages that can be obtained by the present invention are not limited to the aforementioned advantages and other advantages which are not mentioned will be apparent from the following description to the person with an ordinary skill in the art to which the present invention pertains.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

MODE FOR THE INVENTION

Reference will now be made in detail to the preferred embodiments of the present invention, examples of which are illustrated in the accompanying drawings. The embodiments described in the following description include the examples showing that the technical features of the present invention are applied to 3GPP system.

In the following description, a system, of which system band uses a single component carrier, is named a legacy system or a narrowband system. On the contrary, a system, of which system band includes a plurality of component carriers and uses at least one component carrier as a system block of a legacy system, is named an evolved system or a wideband system. A component carrier used as a legacy system block has the same size of a system block of a legacy system. Yet, sizes of the rest of the component carriers are specifically non-limited. For system simplification, it is able to determine the sizes of the rest of the component carriers based on the system block size of the legacy system as well. For instance, 3GPP LTE system and 3GPP LTE-A system are related to a legacy system and an evolved system, respectively.

Based on the above definitions, the 3GPP LTE is named an LTE system or a legacy system in the present specification. And, user equipment supporting the LTE system is named LTE user equipment or legacy user equipment. On the contrary, the 3GPP LTE-A system is named an LTE-A system or an evolved system. Moreover, user equipment supporting the LTE-A system is named LTE-A user equipment or an evolved user equipment.

For clarity and convenience, although an embodiment of the present invention is exemplarily described in the present specification using the LTE system and the LTE-A system, the embodiment of the present invention is also applicable to any kinds of communication systems corresponding to the above definitions. Although an embodiment of the present invention is exemplarily described with reference to FDD scheme in the present specification, the embodiment of the present invention is easily modified and applicable to H-FDD or TDD scheme.

Figure 1:
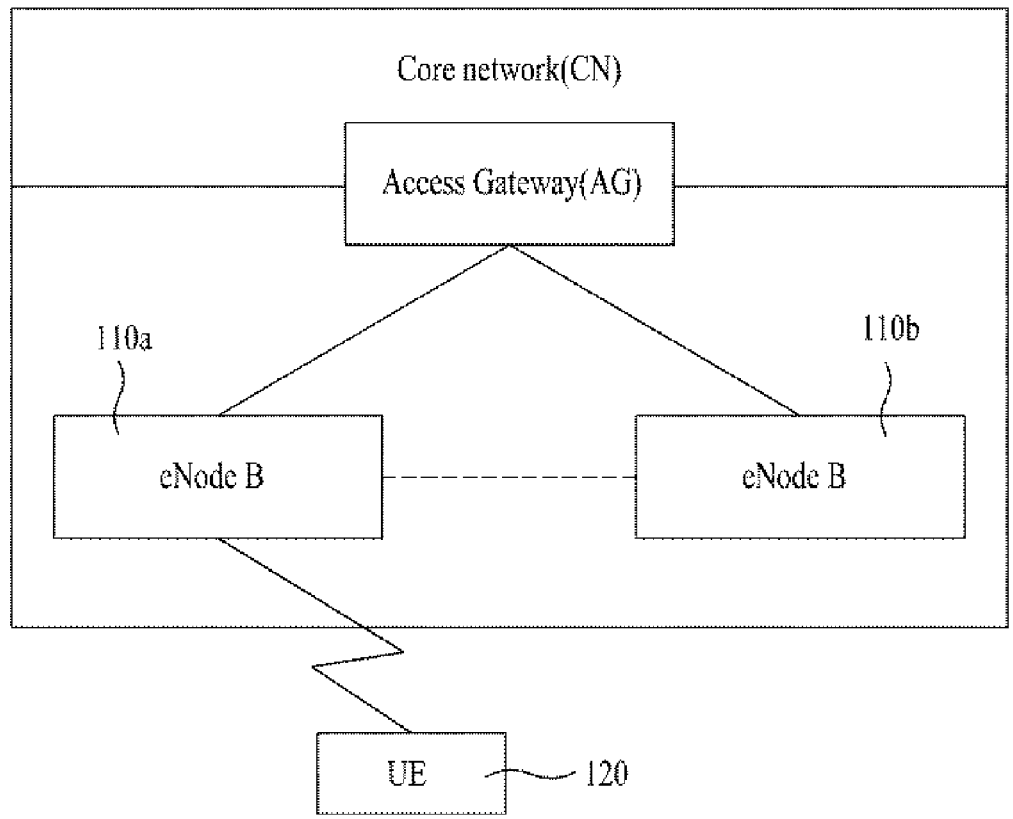
FIG. 1 is a diagram for an example of a wireless communication system.
Figure 2:
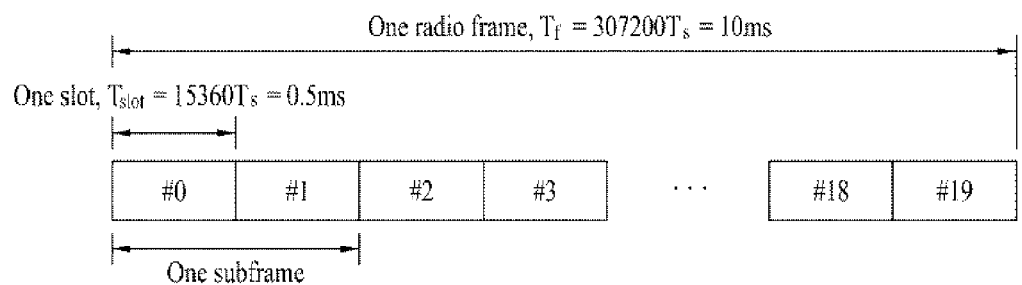
FIG. 2 is a diagram for an example of a structure of a radio frame used for LTE system.

FIG. 2 is a diagram for an example of a structure of a radio frame used for LTE system.

Referring to FIG. 2, a radio frame has a length of 10 ms (327200 ? Ts) and is constructed with 10 subframes in equal size. Each of the subframes has a length of 1 ms and is constructed with two slots. Each of the slots has a length of 0.5 ms (15360 ? Ts). In this case, Ts indicates a sampling time and is expressed as Ts=1/(15 kHz×2048)=3.2552×10-8 (about 33 ns). The slot includes a plurality of OFDM (or SC-FDMA) symbols in a time domain and includes a plurality of resource blocks (RB) in a frequency domain. In the LTE system, one resource block includes '12 subcarriers×7 or 6 OFDM (or SC-FDMA) symbols'. A transmission time interval (TTI), which is a unit time for transmitting data, can be determined by at least one subframe unit. The above described structure of the radio frame is just exemplary. And, the number of subframes included in a radio frame, the number of slots included in a subframe and/or the number of OFDM (or SC-FDMA) symbols included in a slot can be modified in various ways.

Figure 3:
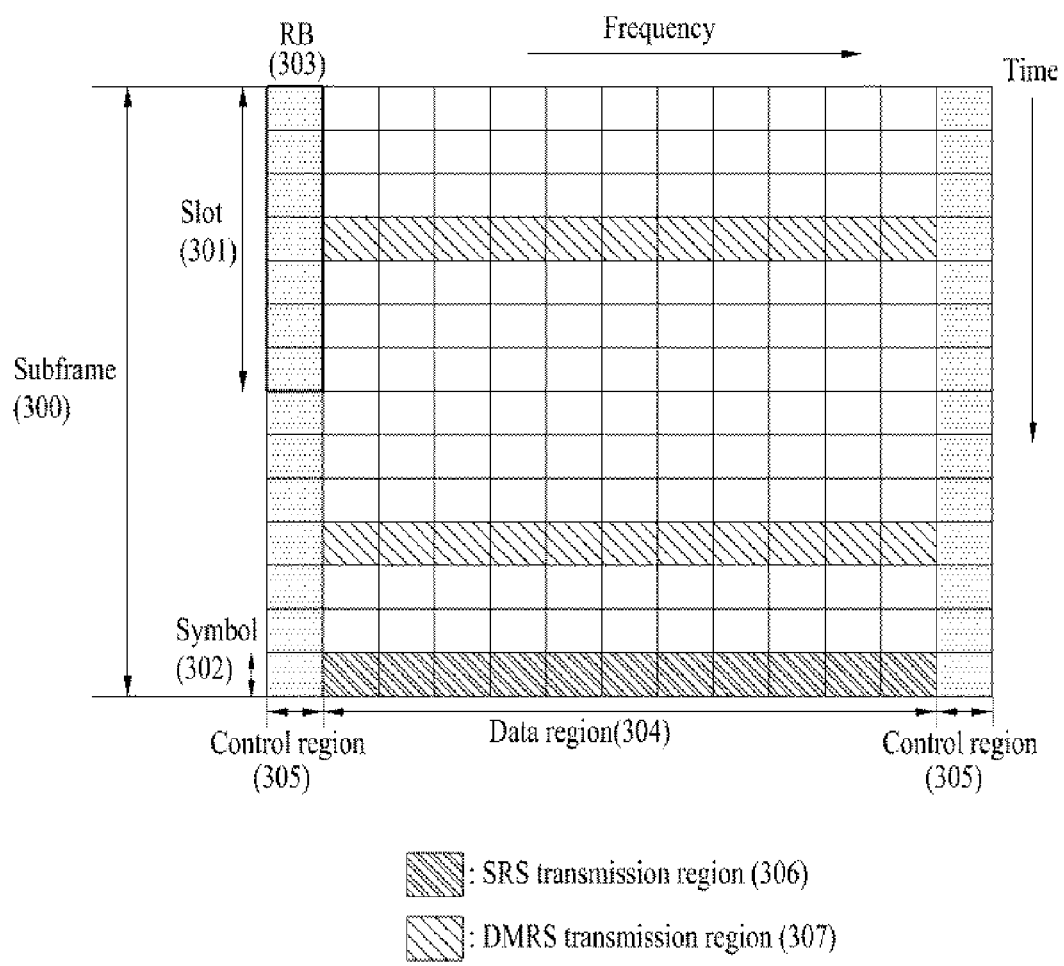
FIG. 3 is a diagram for a structure of an uplink subframe used for LTE system.

FIG. 3 is a diagram for a structure of an uplink subframe used for LTE system.

Referring to FIG. 3, a subframe 300 having 1 ms length, which is a basic unit of LTE uplink transmission, includes two 0.5 ms slots 301. In case of assuming a length of a normal cyclic prefix (CP), each slot includes 7 symbols 302. And, each of the symbols corresponds to one SC-FDMA symbol. A resource block (RB) 303 is a resource allocation unit corresponding to 12 subcarriers in a frequency domain or one slot in a time domain. A structure of an uplink subframe of LTE is mainly divided into a data region 304 and a control region 305. In this case, the data region means a series of communication resources used in transmitting such data sent to each user equipment as voice, packet and the like and corresponds to the rest of resources except the control region within a subframe. The control region means a series of communication resources used in transmitting downlink channel quality report from each user equipment, reception ACK/NACK for a downlink signal, uplink scheduling request and the like.

Figure 4:
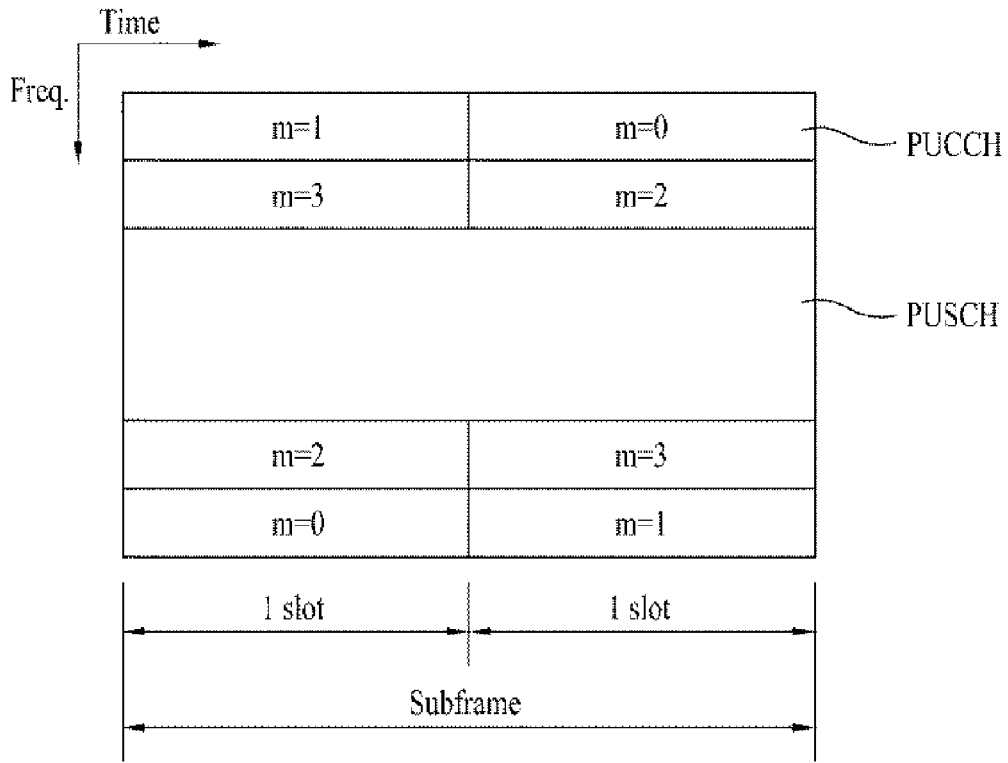
FIG. 4 is a diagram illustrating PUSCH and PUCCH in an uplink subframe used in an LTE system.

FIG. 4 is a diagram illustrating PUSCH and PUCCH in an uplink subframe used in an LTE system.

Referring to FIG. 4, the uplink subframe includes a region to which a physical uplink control channel (PUCCH) carrying control information is allocated, and a region to which a physical uplink shared channel (PUSCH) carrying user data is allocated. The center part of the subframe is allocated to the PUSCH, and both parts of the data region in the frequency region are allocated to the PUCCH. Examples of the control information transmitted on the PUCCH include ACK/NACK response used for HARQ, a channel quality indicator (CQI) indicating the status of a downlink channel, a rank indicator (RI) for MIMO, and a scheduling request (SR) corresponding to uplink resource allocation request. The PUCCH for one user equipment uses one resource block that occupies different frequencies in each slot within the subframe. Namely, two resource blocks allocated to the PUCCH undergo frequency hopping in the boundary of the slots. Particularly, FIG. 4 exemplarily illustrates that PUCCH of m=0, PUCCH of m=1, PUCCH of m=2, and PUCCH of m=3 are allocated to the subframe.

Figure 5:
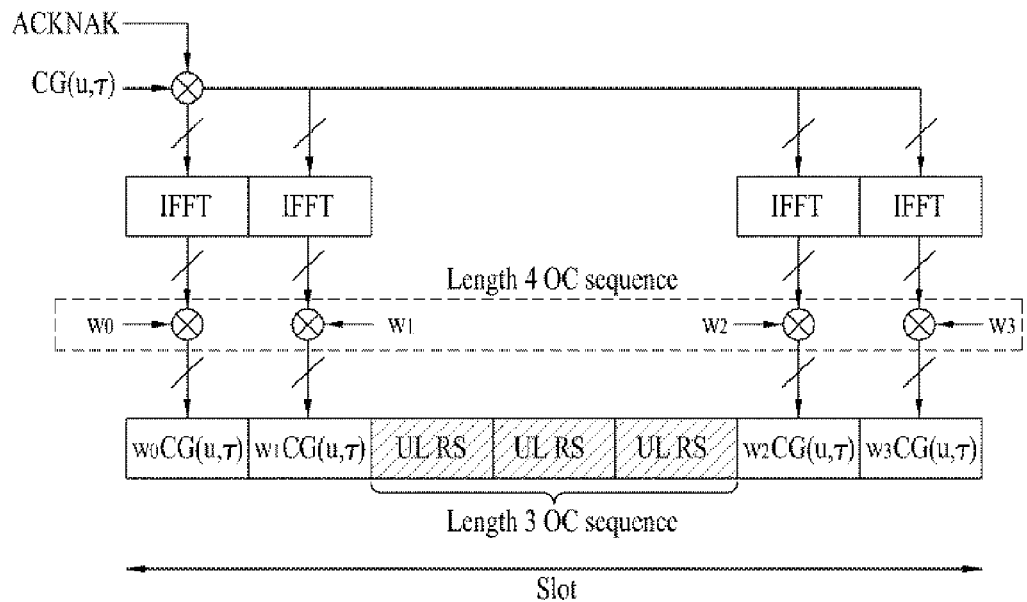
FIG. 5 is a diagram illustrating a structure of a PUCCH 1a/1b for ACK/NACK transmission in an LTE system.

FIG. 5 is a diagram illustrating a PUCCH format 1a/1b structure for ACK/NACK transmission in an LTE system.

Referring to FIG. 5, in case of a normal cyclic prefix (CP), a slot includes seven SC-FDMA symbols. A reference signal is carried in three successive SC-FDMA symbols located in the center of the slot, and ACK/NACK response is carried in the other four SC-FDMA symbols. In case of an extended CP, the slot includes six SC-FDMA symbols, wherein a reference signal is carried in the third and fourth SC-FDMA symbols.

Resources for ACK/NACK transmission are identified using different cyclic shifts (CS) (frequency spreading) of computer generated constant amplitude zero auto correlation (CG-CAZAC) sequence and different Walsh/DFT orthogonal codes (time spreading). w0, w1, w2, w3 multiplied after IFFT obtain the same result even though they are multiplied before IFFT. Resource blocks for ACK/NACK transmission are allocated to be orthogonal to each other in the frequency region.

Supposing that available cyclic shifts are six and available Walsh/DFT codes are three, eighteen user equipments can be multiplexed into one resource block. In the LTE system, PUCCH resource for ACK/NACK transmission is indicated by index representing a pair of cyclic shift and orthogonal code.

Figure 6:
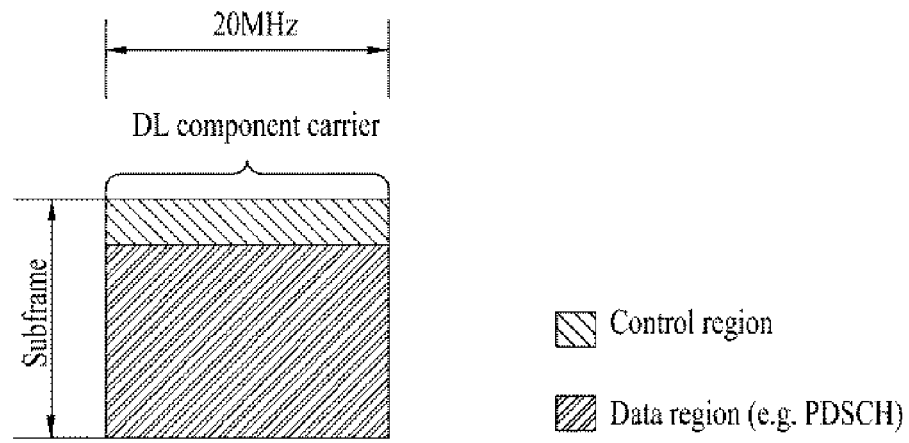
FIG. 6 is a diagram illustrating an example of communication under a single component carrier.
Figure 6:
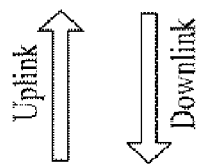
Figure 6:
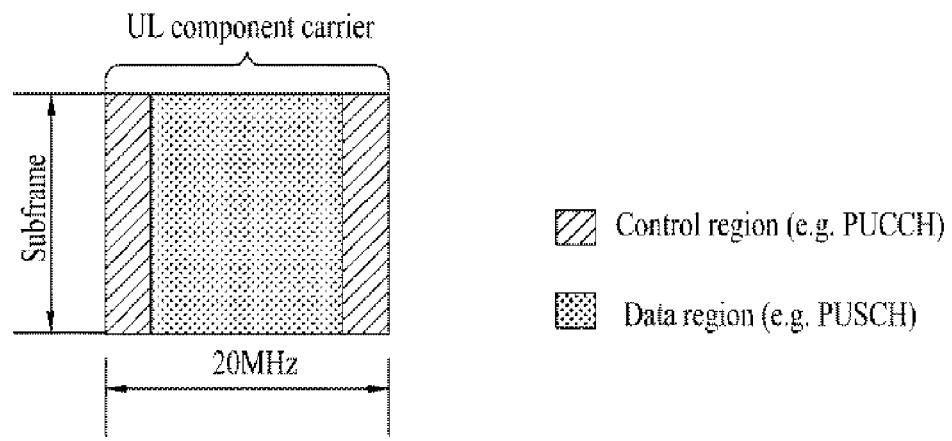

FIG. 6 is a diagram illustrating an example of communication under a single component carrier. The FDD scheme may carry out data transmission/reception through a single downlink band and a single uplink band corresponding thereto. In more detail, in accordance with the FDD scheme, the radio frame structure of FIG. 2 is used only for downlink or uplink transmission. On the other hand, the TDD scheme divides the same frequency band into a downlink interval and an uplink interval in a time domain, such that it performs data transmission/reception using the downlink interval and the uplink interval. In more detail, in the TDD scheme, the radio frame structure of FIG. 2 is classified into a downlink transmission part and an uplink transmission part. FIG. 6 may correspond to an exemplary communication of the LTE system.

Next, a method for performing a Hybrid Automatic Repeat and request (HARM) procedure by the UE will hereinafter be described with reference to FIG. 5. In the LTE system, control information (e.g., scheduling information) for downlink data transmission of a BS may be transferred to the UE over a downlink control channel established in a control region of a downlink subframe. The downlink control channel may include a Physical Downlink Control Channel (PDCCH). The UE may receive scheduling information (e.g., resources to which data is allocated, data size, coding scheme, redundancy version, etc.) over a control channel, and may receive the scheduled data over a downlink shared channel indicated by scheduling information. The downlink shared channel may include a Physical Downlink Shared Channel (PDSCH). Subsequently, the UE may transmit reception response information (e.g., HARQ ACK/NACK information) related to downlink data to the BS over an uplink control channel established in a control region of an uplink subframe. The uplink control channel may include a Physical Uplink Control Channel (PUCCH). For convenience of description and better understanding of the present invention, the term HARQ ACK/NACK will hereinafter be referred to as ACK/NACK. The BS receives ACK/NACK information from the UE, and retransmits downlink data indicated by a NACK signal. If the BS transmits several downlink data to the UE, the HARQ procedure may be carried out on the basis of a transport block corresponding to each downlink data.

In the LTE system, PUCCH resources for transmitting ACK/NACK information may include the location of frequency-time resources (e.g., resource blocks), a cyclic shift of a sequence for frequency spreading, and a (Quasi)-orthogonal code for time spreading. The frequency spreading sequence may include a Computer Generated Constant Amplitude Zero Auto Correlation (CG-CAZAC) sequence. A (Quasi-) orthogonal code for time spreading may include a Walsh/DFT code. The PUCCH resources may be represented by a combination of the above three resources, and each PUCCH resource may be indicated by PUCCH (resources) indexes.

In the LTE system, PUCCH resources for transmitting ACK/NACK information are not pre-allocated to each UE, and several UEs contained in a cell may share several PUCCH resources at respective time points. In more detail, PUCCH resources used for the UE that transmits ACK/NACK information may correspond to a PDCCH that carries scheduling information about corresponding downlink data. In more detail, the entire region where each downlink subframe transmits a PDCCH includes a plurality of Control Channel Elements (CCEs), and the PDCCH transmitted to a UE may be composed of one or more CCEs. A UE transmits ACK/NACK information through PUCCH resources corresponding to a specific CCE (e.g., a first CCE) among CCEs constructing a PDCCH received at the UE. In the LTE system, PUCCH resource indexes can be determined by the following equation 1.

$$n^{(1)}_{PUCCH} = n_{CCE} + N^{(1)}_{PUCCH}$$ [Equation 1]

In Equation 1, $n^{(1)}_{PUCCH}$ is a PUCCH resource index, $N^{1}_{PUCCH}$ is a signaling value received from an upper layer, $n_{CCE}$ is the smallest CCE index among CCE indexes used for PDCCH transmission.

Figure 7:
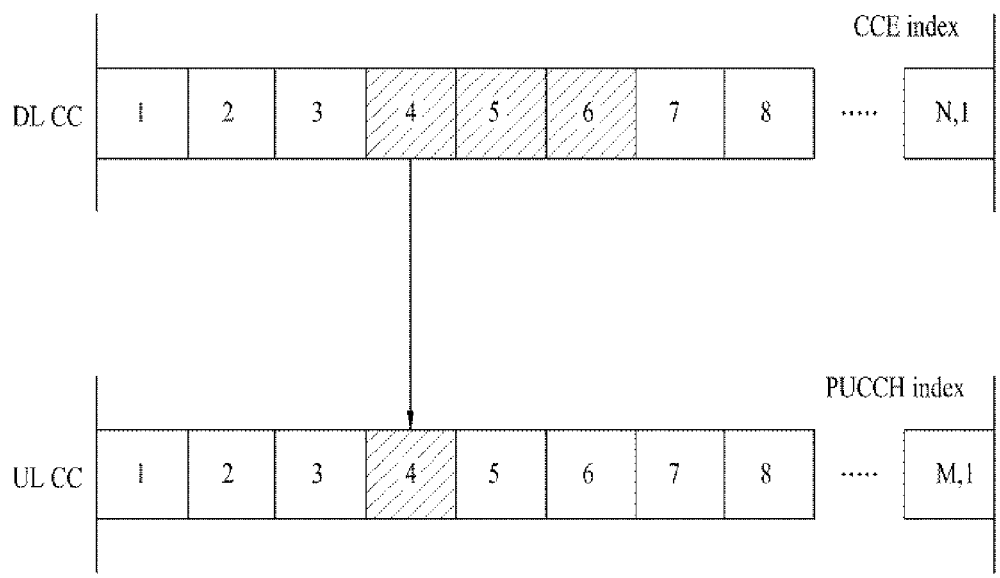
FIG. 7 is a conceptual diagram illustrating the relationship between a Physical Uplink Control CHannel (PUCCH) and a Physical Downlink Control CHannel (PDCCH) for ACK/NACK transmission.

FIG. 7 is a conceptual diagram illustrating the relationship between a Physical Uplink Control CHannel (PUCCH) and a Physical Downlink Control CHannel (PDCCH) for ACK/NACK transmission. Referring to FIG. 7, each square in a downlink component carrier (DL CC) indicates a CCE, and each square in an uplink component carrier (UL CC) indicates PUCCH resources. Each PUCCH index may correspond to PUCCH resources for transmitting ACK/NACK information. If it is assumed that PDSCH information is transferred over a PDCCH composed of fourth to sixth CCEs (i.e., Nos. 4 to 6 CCEs) as shown in FIG. 6, the UE transmits ACK/NACK information over the fourth PUCCH corresponding to the 4-numbered CCE serving as a first CCE of the PDCCH. FIG. 6 shows an exemplary case in which a maximum of M PUCCHs for ACK/NACK information are present in the UL CC when a maximum of N CCEs are present in the DL CC. System may be configured as N=M, but M and N may have different values, and CCEs and PUCCHs may overlap with one another in their mapping process as necessary.

Figure 8:
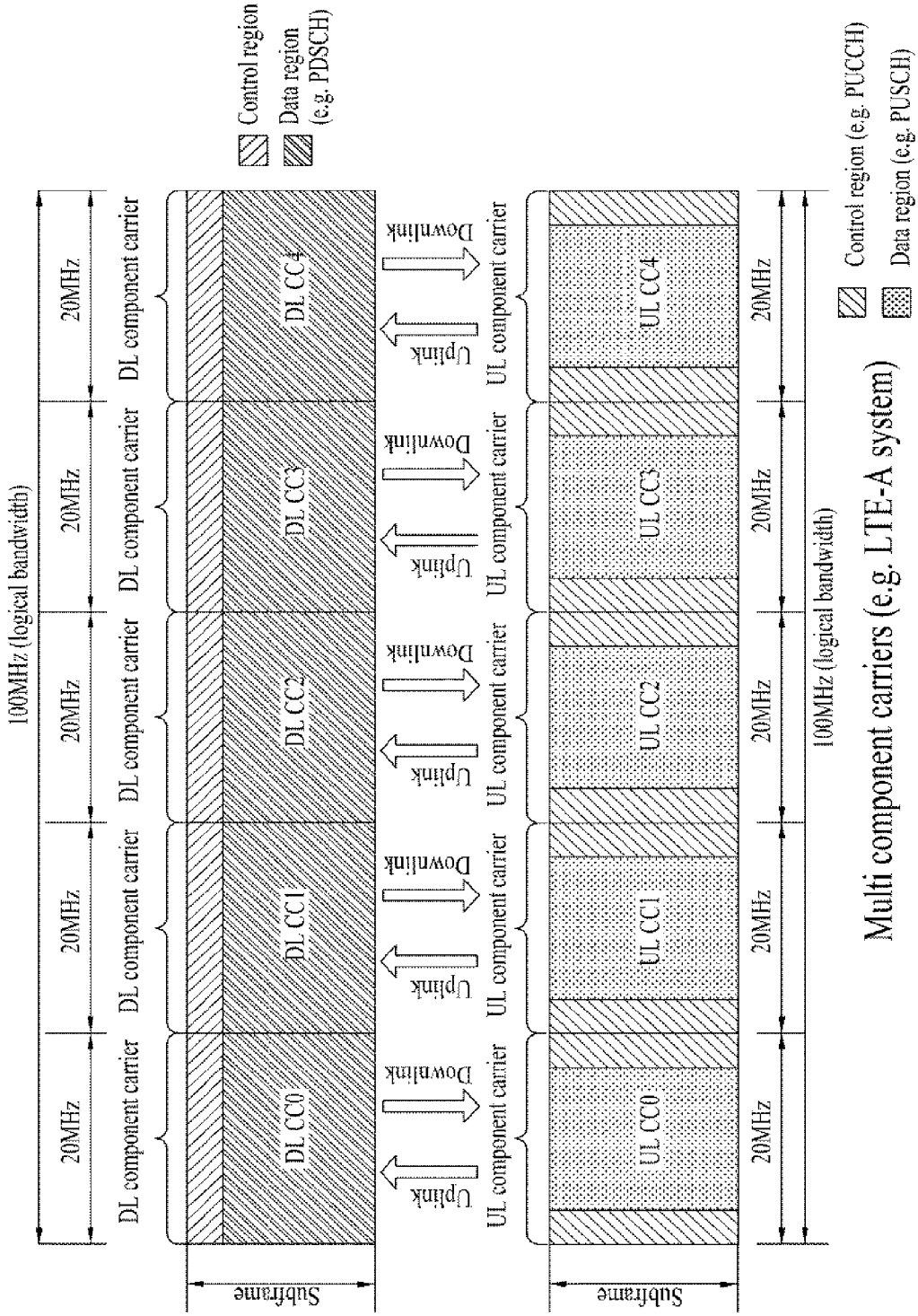
FIG. 8 is a diagram illustrating an example of communication under a plurality of component carriers.

FIG. 8 shows an example of communication under a multi-component carrier situation. FIG. 8 may correspond to an example of communication for use in the LTE-A system. The LTE system uses a carrier aggregation (or a bandwidth aggregation) technology so as to utilize a wider frequency band, wherein the carrier aggregation technology collects several uplink/downlink (UL/DL) frequency blocks and uses a larger uplink/downlink (UL/DL) bandwidths. Respective frequency blocks are transferred using Component Carriers (CCs). The term CC may indicate a frequency block for carrier aggregation or a center carrier of the frequency block, and may also indicate a combination thereof.

Referring to FIG. 8, five 20 MHz-CCs are collected in each of a downlink and an uplink so as to support a 100 MHz bandwidth. CCs may neighbor with each other or may not neighbor with each other. The radio frame structure exemplified in FIG. 2 can be applied to a situation of multi component carriers in a same way. Only, the radio frame, the subframe and the slot are time units, and so for example the base station and the user equipment can transmit/receive signals through a plurality of component carriers in one subframe. For convenience of description, FIG. 8 shows an exemplary case wherein a bandwidth of the UL CC is identical and symmetrical to that of the DL CC. However, the bandwidth of each CC may be independently determined. For example, the bandwidth of the UL CC may be represented by 5 MHz(UL CC0)+20 MHz(UL CC1)+20 MHz(UL CC2)+20 MHz(UL CC3)+5 MHz(UL CC4). In addition, it may also be possible to carry out asymmetrical carrier aggregation where the number of UL CCs is different from the number of DL CCs. Asymmetrical carrier aggregation may be generated due to the limitation of available frequency band, or may be artificially constructed by the network setup.

Although FIG. 8 shows that an uplink (UL) signal and a downlink (DL) signal are transmitted through one-to-one mapped CC, a CC where a signal is actually transmitted may be changed to another CC according to a network setup or signal categories. For example, a CC for scheduling command transmission may be different from a CC for data transmission in response to a scheduling command. In addition, UL/DL control information may be transmitted over a specific UL/DL CC irrespective of the presence or absence of mapping between CCs.

In the meantime, although the entire band of a system is composed of N CCs, a frequency band that can be received at a specific UE may be limited to M CCs (where M<N). Various parameters in relation to carrier aggregation may be established according to any of a cell-specific scheme, a UE group-specific scheme, or a UE specific scheme. Accordingly, when N CCs are present in the cell, the UE can receive a PDSCH through all N CCs, but a base station (BS) may also limit the number of CCs capable of enabling the UE to receive the PDSCH to M (where M<N) according to the semi-static scheme. Next, although it is assumed that the following embodiments of the present invention can be applied to N CCs for convenience of description, it is obvious to those skilled in the art that the embodiments of the present invention are also applied to M CCs. In addition, N CCs (or M CCs) allocated to the UE are divided into L CC groups, and the following embodiments may also be applied to each CC group.

In LTE specification, the uplink control resource such as PUCCH resource is determined by the lowest CCE index with upper layer signaled offset value. Since there is only one resource requirement per subframe, it is natural to define one-to-one mapping between resource allocation grant and its corresponding uplink control resource. However, as introduced in LTE-A system, carrier aggregation feature enables multiple transport block reception per subframe which will require multiple ACK/NACK responses from LTE-A UE.

To report multiple ACK/NACK, one of easy approach is to design a new uplink control channel which can support enough number of ACK/NACK transmissions per resource. However, considering legacy compatibility and uplink frequency resource efficiency, the reuse of legacy control channel structure can be another approach and efficient on uplink frequency resource utilization. Hereinafter, allocation methods which enable multiple ACK/NACK resource identification are disclosed.

The simplest extension from legacy system is just to force an LTE-A UE consuming multiple PUCCH resources where the first resource index can be determined as in the same way of legacy system. This approach can have severe blocking on legacy scheduling procedure. Since current LTE air interface is defined to use only one PUCCH resource per UE, if there are LTE-A UEs which uses multiple resources where the multiple uplink control channel resources can be contiguous or distributed over available PUCCH resources, then some of LTE UEs and some of LTE-A UEs can have enough PUCCH resources with current allocation schemes. Therefore, assuming LTE-A UE needs to utilize multiple PUCCH resources, several approach can be proposed as following.

First Embodiment

Simple Extension with PUCCH Resource Division

Since the most serious issue with carrier aggregation and its corresponding PUCCH resource allocation is the blocking on implicit PUCCH resource assignment and indication within PDCCH search space, there should be some measures not to concentrate the used PUCCH resources of single UE onto specific range of legacy PUCCH resource region. The possible approaches can be itemized as 1) contiguous/non-contiguous PUCCH resource+start/mid/end index from legacy PUCCH resource determination method [CCE index+offset], 2) contiguous/non-contiguous PUCCH resource+start/mid/end index from new PUCCH resource determination method.

The contiguous or non-contiguous PUCCH resource are defined as: contiguous PUCCH resource usage if the used PUCCH resource indices are contiguous in logical domain of PUCCH allocation space and non-contiguous PUCCH resource usage if the used PUCCH resource indices are not neighboring where some of them can be neighboring or some of them can be separated by pre-specified spaces, such as separation sequence or equal spaced distance, in logical domain of PUCCH allocation space.

As a first embodiment, if each or some parts of multiple PUCCH resource are allocated to different PUCCH resource block, the values of index or offset may be a specific value which enables different resource block allocation Here, index determination from PDCCH allocation can be defined as a new method for LTE-A UE. For example, if jointly coded PDCCH is received for downlink grant of multiple component carriers, then there is only one CCE which corresponds to only one PUCCH resource. Therefore, a specific resource assignment for remaining (or a given number of) PUCCHs in addition to legacy implicit resource assignment for one PUCCH may be defined and applied. More specifically, we can define additional offset value with such as scaled value of carrier index offset, carrier-dependent offset value, and so on. Note that these values should be known by system information or UE-specific information.

Another note on this approach is that the used PUCCH resources are fully shared with legacy UEs and the PUCCH resource index should be modulo-calculated such that if an index value exceeds the range, the index value should be wrapped around.

As a different method, a kind of direct or indirect PUCCH resource assignment information, e.g. the offset value(s) may be explicitly defined and included in the downlink control information format (or payload) of the jointly coded PDCCH. If a kind of PDCCH for UE-specific carrier assignment is defined over the DL grant PDCCHs, these PUCCH resource assignment information, e.g. the offset value(s) may be explicitly defined and included in the downlink control information format (or payload) of the UE-specific carrier assignment PDCCH.

However, if separately coded PDCCHs are used for grant transmission, there exist individual reference CCE index for each PDCCH. If all or some of PDCCHs are transmitted via one single downlink carrier, then the corresponding PDCCH will have different lowest CCE indices and the PUCCH resource resolution does not cause any problem. Therefore, separate resource index calculation based on legacy method can be used. However, even for this case, the methods defined above may be still used where the lowest CCE index can be defined based on specific PDCCH sorting rule such as overall lowest CCE or the scheduled carrier index dependent CCE index selection (e.g. lowest CCE index of lowest/largest carrier index).

On the other hand, if PDCCHs are transmitted over multiple downlink carriers, there can be collision among different downlink grant PDCCH since the same CCE indices of different downlink carrier can be used. For this case, it would be better to just use only one carrier's lowest CCE index, where the corresponding carrier can be anchor/primary/UE-specific-indicated carrier.

Second Embodiment

Carrier-Based Offset Application on PUCCH Resources

Though the PUCCH resource index for each downlink carrier can be determined according to the first embodiment, there can be still issues with PUCCH resource utilization. For example, if there are several LTE-A UEs employing carrier aggregation so that multiple PUCCH resources are required. In this case, the used PUCCH resources can come together within small range of legacy PUCCH resource.

To avoid this issue, PUCCH resource separation can be considered so that the useable PUCCH resource for carrier 1 is region 1, carrier 2 on region 2 and so on, where the PUCCH resource index should be wrapped around within each usable PUCCH resource index range. The resource region can be defined as equally divided legacy PUCCH resource or system-indicated resource regions which are broadcast by system information.

If a different type of downlink component carrier or PDCCH encoding is considered, the PUCCH resource region for each component carrier can be defined differently. The base position within each carrier-specific PUCCH resource region can be the same for all carriers as in jointly/separately coded PDCCH or can be different as in separately coded PDCCHs.

Note that the second embodiment can be realized with carrier-specific offset application of a base CCE index position without specifically defining carrier-depending PUCCH resource regions.

Figure 9:
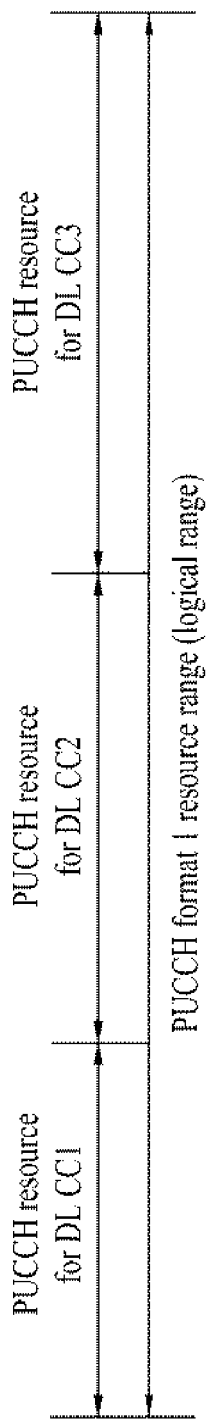
FIG. 9 is a diagram illustrating an example of an example on the PUCCH resource division according to the second embodiment.

FIG. 9 is a diagram illustrating an example of an example on the PUCCH resource division according to the second embodiment. Specifically, in FIG. 9, three downlink component carriers are mapped to one uplink component carrier.

Referring to FIG. 9, the size of each region can be the same or different depending on the eNB operation mode. Note that the physical mapping between downlink component carrier and uplink resource area (regardless of uplink component carrier) may be fixed to facilitate the different UE type multiplexing.

Third Embodiment

Legacy PUCCH Resource+Additional New PUCCH Resources

Compared to the second embodiment, there can be additional resource definition for LTE-A UEs which can accommodate more ACK/NACK information per PUCCH resource.

Note that this resource can be appended on the end of PUCCH format 1 series resource or can reside within PUCCH format 2 series resource.

If new PUCCH resources are defined, then LTE-A can have three approaches. One is to reuse legacy PUCCH resource, another is to use both legacy and new PUCCH resource and the other is to use only new PUCCH resource. Note that if LTE-A UEs use only legacy PUCCH resource, then the approaches described in the first and second embodiments can be defined.

On the other hand, if legacy PUCCH resource is used in combination with new PUCCH resource, then some of PDCCH responses can be transmitted via legacy PUCCH resources and the other responses can be transmitted via new PUCCH resources.

For example, if primary/anchor/UE-specifically-indicated downlink carrier contains PDCCH(s), then the corresponding ACK/NACK response can be defined on only legacy PUCCH resource or only new PUCCH resources. If the load on legacy PUCCH resource becomes serious, then only special PDCCH(s) or only one PDCCH of primary/anchor/UE-specifically-indicated downlink carrier is mapped to legacy PDCCH resource only. The special PDCCH can be UE-specific control information or PDCCH only control information, such as VoIP service related control, UE carrier aggregation related control, UE power control information, CoMP (Cooperated) operation related information, high-order MIMO operation related information, etc.

Note that new PUCCH resource can have up to X ACK/NACK transmission capability, where X can be larger than 2. If X can accommodate all the ACK/NACK responses, then only one PUCCH resource is used. However, if the required number of PUCCH resource in both legacy and new PUCCH resource region is more than one, then the same procedures proposed in the first and second embodiments can be still reused.

Figure 10:
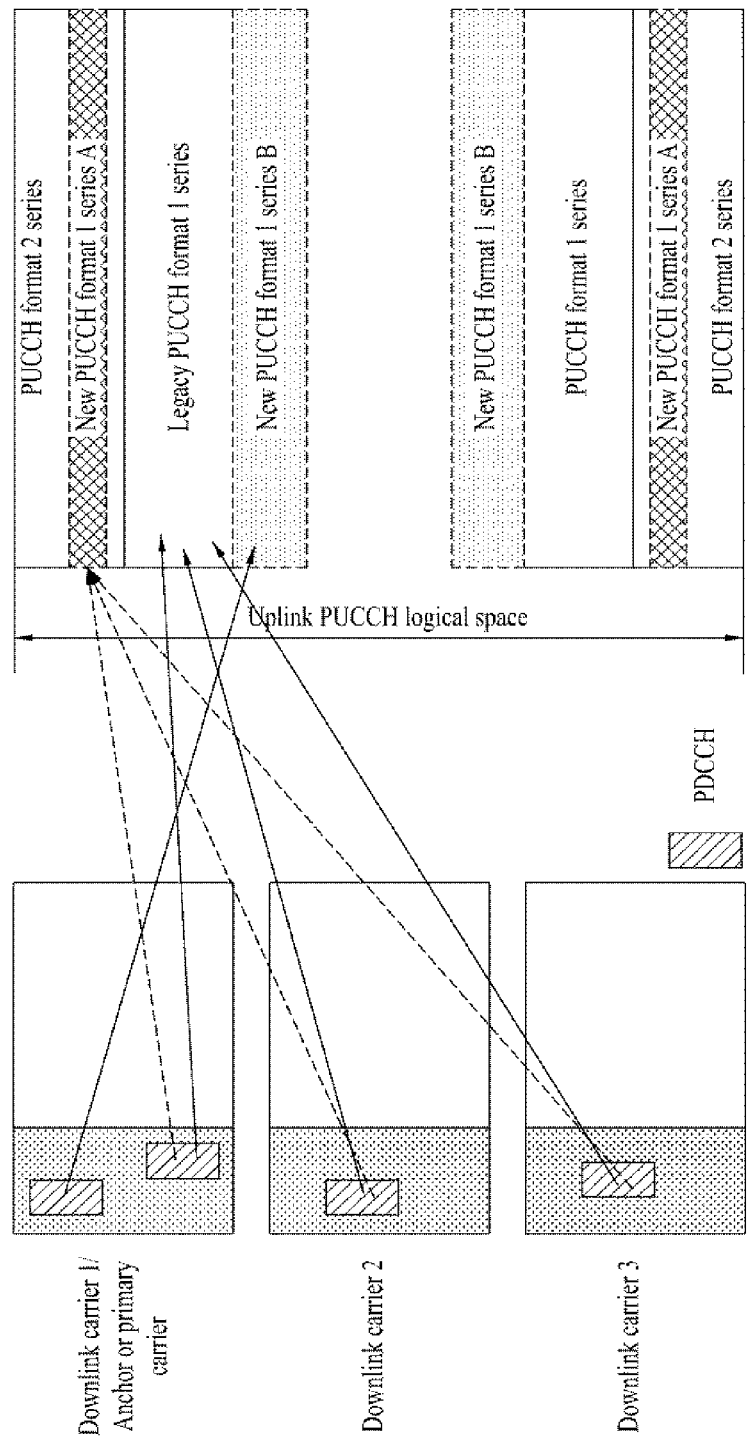
FIG. 10 is a diagram illustrating example on the PDCCH response mapping to PUCCH resource according to the third embodiment.

FIG. 10 is a diagram illustrating example on the PDCCH response mapping to PUCCH resource according to the third embodiment. Specifically, in FIG. 10, specific PDCCH or one of PDCCH is differentiated and mapped to the new PUCCH and the other PUCCHs are mapped the legacy PUCCH region.

Note that the mapping between specific PDCCH and the others can be reverse. That is, the specific PDCCH is mapped to the legacy PUCCH region and the other PUCCHs are mapped to the new PUCCH region.

Note that if new PUCCH format can accommodate multiple ACK/NACK responses, multiple PDCCH can be mapped to one new PUCCH resource as shown in FIG. 10 as dotted lines.

Fourth Embodiment

Information-Specific PUCCH Resources

Differentiation on the PUCCH resource usage can depend on the PDCCH information type. That is, even though several PDCCHs are received from one or more downlink carriers, some of the PDCCHs can be mapped to specific PUCCH resource which can be legacy PUCCH resource or new PUCCH resource.

For example, if a PDCCH is transmitted for VoIP operations such as semi-persistent scheduling activation and deactivation, then the used PUCCH resource may be fixed to the specific PUCCH region (such as legacy PUCCH resource). However, for the flexible usage of PUCCH resource, the initial usage of PUCCH resource for ACK/NACK feedback may be allocated to legacy resource and the successive ACK/NACK can be mapped to new PUCCH resource to alleviate the PUCCH overhead.

On the other hand, if a PDCCH is used for carrier aggregation or carrier utilization, then the corresponding PDCCH response should be protected more robustly among PUCCH resource so that the ACK/NACK response should be reported with better QoS than the normal ACK/NACK transmission. That is, the PUCCH resource for this kind of PDCCH can be selected from the most reliable PUCCH resource, which can be from legacy PUCCH or new PUCCH resource.

Since the PUCCH resource index for each component carrier or PDCCH can be separated by large amount, the total size of PUCCH resource may be necessary to identify the proper PUCCH resource region. One of the parameter to be known is the size of legacy PUCCH resource size or range, the other one is the additional new PUCCH resource size or location which may be within PUCCH format 2 series or append to the legacy PUCCH format 1.

If there is QoS differentiation between PUCCH resource, it would be better to have proper description on each PUCCH resource region so that different QoS PUCCH resource can be utilized depending on the indicated PDCCH information or type.

Fifth Embodiment

Multiple ACK/NACK Feedback on PUSCH

When multiple ACK/NACK feedback is required for a UE, a PUSCH resource may be assigned for the multiple ACK/NACK feedback. The UL grant PDCCH for this PUSCH resource assignment may be transmitted with the DL grant PDCCH together within a subframe. As a different method, the UL grant control information for this ACK/NACK feedback can be multiplexed with DL grant control information in a DL grant PDCCH payload. Further, this PUSCH resource region may be pre-defined.

If there is no uplink shared channel data, the multiple ACK/NACK feedback is encoded and modulated with the same way for the normal uplink shared channel data. In addition, the ACK/NACK information can be pre-encoded before entering encoder in order to provide lower code rate.

On the other hand, a different encoding scheme can be applied for the multiple ACK/NACK information in order to provide a lower code rate. Totally different from the encoding and modulation for normal uplink data, a specific physical resource mapping (i.e. a specific limited subcarrier mapping for this multiple ACK/NACK feedback with different encoding scheme and/or difference modulation and/or different multiplexing method) can be applied for a given allocated physical resource block(s). This specific physical resource mapping method can be the same as the method for mapping physical resource to ACK/NACK in Rel-8 LTE.

If there is uplink share data to be transmitted simultaneously with the multiple ACK/NACK information, the same downlink control information format (or payload) of UL grant with that of uplink shared data only case can be applied for PUSCH resource assignment and transmission type/format indication. And, the same data and control (ACK/NACK) multiplexing scheme as LTE Rel-8 can be applied.

In addition to that, in order to preclude the ambiguity due to DTX, the physical resource for individual ACK/NACK information of multiple ACK/NACKs can be reserved according ACK/NACK information order. As a different method, a new specific physical resource mapping (i.e. a specific limited subcarrier mapping for this multiple ACK/NACK feedback with different encoding scheme and/or difference modulation and/or different multiplexing method) based on data resource puncturing or data rate matching can be applied for a given allocated physical resource block(s).

On the other hand, a kind of MAC-level multiplexing between uplink data and multiple ACK/NACK feedback information or a method of ACK/NACK information resource mapping first and then uplink shared data resource mapping as same (or very similar) as CQI and data multiplexing method in LTE Rel-8 uplink. The above proposed resolving the ambiguity problem due to DTX also can be applied in the other entire proposals in this patent including those in case of multiple ACK/NACK feedback without uplink shared data in PUSCH.

Figure 11:
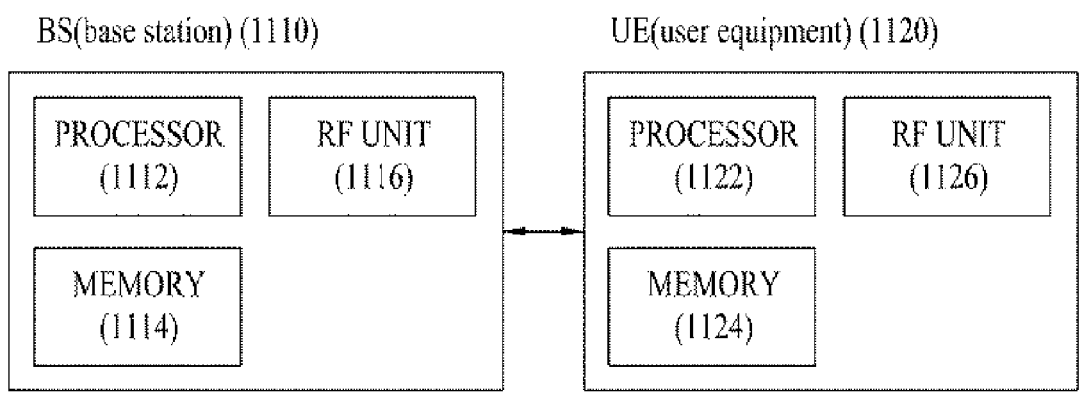
FIG. 11 is a block diagram for an example of a transmitter and receiver according to one embodiment of the present invention.

FIG. 11 is a block diagram for an example of a transmitter and receiver according to one embodiment of the present invention In FIG. 11, a wireless communication system includes a BS 1110 and one or more UE 1120. In downlink, a transmitter may be a part of the BS 1110, and a receiver may be a part of the UE 1120. In uplink, a transmitter may be a part of the UE 1120, and a receiver may be a part of the BS 1110.

A BS 1110 may include a processor 1112, a memory 1114, and a radio frequency (RF) unit 1116. The processor 1112 may be configured to implement proposed procedures and/or methods described in this application. The memory 1114 is coupled with the processor 1112 and stores a variety of information to operate the processor 1112. The RF unit 1116 is coupled with the processor 1112 and transmits and/or receives a radio signal.

A UE 20 may include a processor 1122, a memory 1124, and a RF unit 1116. The processor 1122 may be configured to implement proposed procedures and/or methods described in this application. The memory 1124 is coupled with the processor 1122 and stores a variety of information to operate the processor 1122. The RF unit 1116 is coupled with the processor 1112 and transmits and/or receives a radio signal.

The BS 1110 and/or the UE 1120 may have single antenna and multiple antennas. When at least one of the BS 1110 and the UE 1120 has multiple antennas, the wireless communication system may be called as multiple inputs multiple output (MIMO) system.

The above-described embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, embodiments of the present invention are described centering on the data transmission/reception relations between a base station and a terminal. In this disclosure, a specific operation explained as performed by a base station can be performed by an upper node of the base station in some cases. In particular, in a network constructed with a plurality of network nodes including a base station, it is apparent that various operations performed for communication with a terminal can be performed by a base station or other networks except the base station. In this case, 'base station' can be replaced by such a terminology as a fixed station, a Node B, an eNode B (eNB), an access point and the like. And, 'terminal' can be replaced by such a terminology as a user equipment (UE), a mobile station (MS), a mobile subscriber station (MSS)' and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

INDUSTRIAL APPLICABILITY

Accordingly, the present invention is applicable to a wireless communication system. More particularly, the present invention is applicable to a method and apparatus for transmitting a control signal from mobile equipment in a carrier aggregation applied wireless communication system.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

The invention claimed is:

1. A method for transmitting acknowledgement (ACK)/negative ACK (NACK) responses in a wireless communication system, the method comprising:
  receiving a plurality of downlink data channels over multiple downlink component carriers from a base station;
  determining the ACK/NACK responses for the plurality of downlink data channels;
  allocating uplink resources to the ACK/NACK responses; and
  transmitting the ACK/NACK responses using the uplink resources via one uplink component carrier to the base station,
  wherein the uplink resources comprise a legacy physical uplink control channel (PUCCH) resource and a new PUCCH resource, and
  wherein allocating uplink resources to the ACK/NACK responses comprises:
  allocating the legacy PUCCH resource to the ACK/NACK responses which are transmitted for a first time, and
  allocating the new PUCCH resource to the ACK/NACK responses which are transmitted successively after the allocating of the legacy PUCCH resource.

2. The method of claim 1, wherein the new PUCCH resource is appended on the end of the legacy PUCCH resource or resides within the legacy PUCCH resource.

3. The method of claim 1, further comprising:

pre-encoding the ACK/NACK responses in order to provide lower code rate; and encoding the pre-encoded ACK/NACK responses in a same way as for normal uplink data.

4. A user equipment comprising:

a receiving module for receiving a plurality of downlink control channels and a plurality of downlink data channels over multiple downlink component carriers from a base station;

a processor for determining acknowledgement (ACK)/negative ACK (NACK) ACK (Acknowledgement)/NACK (Negative-ACK) responses for the plurality of downlink data channels and for allocating uplink resources to the ACK/NACK responses; and a transmitting module for transmitting the ACK/NACK responses using the uplink resource via one uplink component carrier to the base station, wherein the uplink resources comprise a legacy physical uplink control channel (PUCCH) resource and a new PUCCH resource, and wherein the processor is configured to allocate the legacy PUCCH resource to the ACK/NACK responses which are transmitted for a first time and to allocate the new PUCCH resource to the ACK/NACK responses which are transmitted successively after the allocating of the legacy PUCCH resource.

5. The user equipment of claim 4, wherein the new PUCCH resource is appended on the end of the legacy PUCCH resource or resides within the legacy PUCCH resource.

6. The user equipment of claim 4, wherein the processor pre-encodes the ACK/NACK responses in order to provide lower code rate, before encoding the ACK/NACK responses in a same way as normal uplink data.

* * * * *